(12) United States Patent  
Nolan et al.

(10) Patent No.: US 10,993,108 B2  
(45) Date of Patent: Apr. 27, 2021

(54) WIRELESS ROUTING

(71) Applicant: Nokia Technologies Oy, Espoo (FI)

(72) Inventors: Julian Charles Nolan, Lausanne (CH); Christopher Ian Cox, Cambridge (GB); Debmalya Biswas, Lausanne (CH); Matthew John Lawrenson, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 279 days.

(21) Appl. No.: 15/557,274

(22) PCT Filed: Mar. 17, 2015

(86) PCT No.: PCT/FI2015/050176  
§ 371 (c)(1),  
(2) Date: Sep. 11, 2017

(87) PCT Pub. No.: WO2016/146880  
PCT Pub. Date: Sep. 22, 2016

(65) Prior Publication Data  
US 2018/0063706 A1 Mar. 1, 2018

(51) Int. Cl.  
*H04W 12/02* (2009.01)  
*H04W 8/00* (2009.01)  
(Continued)

(52) U.S. Cl.  
CPC ........... *H04W 12/02* (2013.01); *H04W 8/005* (2013.01); *H04W 8/16* (2013.01); *H04W 40/06* (2013.01);  
(Continued)

(58) Field of Classification Search  
CPC ....... G06Q 20/32; G06Q 20/40; H04W 40/34; H04W 4/00; H04W 12/02; H04W 8/005;  
(Continued)

(56) References Cited

U.S. PATENT DOCUMENTS 6,690,018 B1 * 2/2004 Barone ................ G08B 13/193  
                                                                                                   250/347  
8,103,792 B2 * 1/2012 Tasman ................. H04W 52/46  
                                                                                                   370/229

(Continued)

FOREIGN PATENT DOCUMENTS

CN      101646219 A      2/2010  
CN      101945398 A      1/2011  
(Continued)

OTHER PUBLICATIONS

Office action received for corresponding Japanese Patent Application No. 2017-548948, dated Nov. 6, 2018, 2 pages of office action and 2 pages of office action translation available.

(Continued)

*Primary Examiner* — Thanhnga B Truong  
(74) *Attorney, Agent, or Firm* — Laine IP Oy

(57) ABSTRACT

According to an example aspect of the present invention, there is provided an apparatus comprising a receiver configured to receive, from a first node, an indication of privacy preference and, from a second node, an indication relating to an accuracy at which the second node can determine a location of the first node (510), and at least one processing core configured to determine routing information based at least in part on the indication of privacy preference and the indication relating to the accuracy (520).

18 Claims, 6 Drawing Sheets

(51) Int. Cl.
*H04W 40/06* (2009.01)
*H04W 84/18* (2009.01)
*H04W 8/16* (2009.01)
*H04W 64/00* (2009.01)
*H04W 8/18* (2009.01)

(52) U.S. Cl.
CPC .............. *H04W 84/18* (2013.01); *H04W 8/18* (2013.01); *H04W 64/00* (2013.01); *H04W 64/003* (2013.01)

(58) Field of Classification Search
CPC ....... H04W 8/16; H04W 40/06; H04W 84/18; H04W 24/00; H04L 12/28; H04L 29/06; H04L 63/105; H04L 63/102; G06F 15/173; G06F 11/00; G06F 21/44; G06F 17/30; G06F 19/00; G06F 21/62; G06F 16/95; G06F 19/321; G06F 21/6245; H04B 1/00; H04B 15/00; H04B 7/06; G08B 13/193; G08B 13/189; G08B 23/00; G01S 5/14; G16H 30/20; G16H 15/00; G16H 10/60; G16H 40/20; G16H 40/63

See application file for complete search history.

(56) References Cited

U.S. PATENT DOCUMENTS

| | | | |
|---|---|---|---|
| 9,094,071 B2* | 7/2015 | Nandagopalan | H04B 7/0617 |
| 2006/0079249 A1 | 4/2006 | Shim | |
| 2007/0109982 A1 | 5/2007 | Gudipudi et al. | |
| 2011/0098043 A1 | 4/2011 | Yu et al. | |
| 2011/0223937 A1 | 9/2011 | Leppanen et al. | |
| 2011/0250895 A1* | 10/2011 | Wohlert | H04L 67/26 455/445 |
| 2011/0295957 A1 | 12/2011 | Ananthanarayanan et al. | |
| 2013/0298248 A1 | 11/2013 | Boldrev et al. | |
| 2014/0199970 A1 | 7/2014 | Klotz | |
| 2015/0030157 A1 | 1/2015 | Segev et al. | |
| 2015/0154585 A1* | 6/2015 | Skaaksrud | H04W 12/06 705/44 |
| 2017/0068813 A1* | 3/2017 | Fram | G16H 30/20 |

FOREIGN PATENT DOCUMENTS

| | | |
|---|---|---|
| CN | 103327486 A | 9/2013 |
| CN | 103338444 A | 10/2013 |
| CN | 103974368 A | 8/2014 |
| CN | 104219661 A | 12/2014 |
| JP | 2004517573 A | 6/2004 |
| JP | 2005244547 A | 9/2005 |
| JP | 2016134635 A | 7/2016 |
| KR | 2008-0004909 A | 1/2008 |
| WO | 02/054814 A1 | 7/2002 |
| WO | 2013/170208 A1 | 11/2013 |
| WO | WO2014193749 A1 | 12/2014 |

OTHER PUBLICATIONS

Shen et al., "ALERT: An Anonymous Location-Based Efficient Routing Protocol in MANETs", IEEE Transactions on Mobile Computing, vol. 12, No. 6, Jun. 2013, pp. 1079-1093.

Venkatesan et al., "Anonymizing Geographic Routing for Preserving Location Privacy Using Unlinkability and Unobservability", International Journal of Advanced Research inComputer Science and Software Engineering, vol. 4, No. 3, Mar. 2014, pp. 523-528.

Lu et al., "Anonymous Routing in Ad Hoc Networks Using Directional Antennas", EURASIP Journal on Wireless Communications and Networking, 2009, 8 pages.

Rana et al., "A new 'Direction' for Source Location Privacy in Wireless Sensor Networks", IEEE Global Communications Conference, 2012, pp. 342-347.

Chacko et al., "A Survey on Various Privacy and Security Features Adopted in Manets Routing Protocol", International Mutli-Conference on Automation, Computing, Communication, Control and Compressed Sensing, 2013, pp. 508-513.

Defrawy et al., "Privacy-Preserving Location-based On-demand Routing in Manets", IEEE Journal on Selected Areas in Communications, vol. 29, No. 10, Dec. 2011, pp. 1926-1934.

Carter et al., "Secure Position Aided Ad Hoc Routing", Research Paper, 2003, 6 pages.

Chan et al., "Position Based Directional Ad-hoc Routing with Space Time Diversity", IEEE Global Humanitarian Technology Conference, 2012, pp. 192-197.

Feng, "LMA: Location- and Mobility-aware Medium-access Control Protocols for Vehicular Ad Hoc Networks Using Directional Antennas" IEEE Transactions on Vehicular Technology, vol. 56, No. 6, Nov. 2007, pp. 3324-3336.

International Search Report and Written Opinion received for corresponding Patent Cooperation Treaty Application No. PCT/FI2015/050176, dated Aug. 24, 2015, 14 pages.

Office action received for corresponding Vietnam Patent Application No. 1-2017-03833, dated Oct. 30, 2017, 1 page of office action and 1 page of translation available.

Extended European Search Report received for corresponding European Patent Application No. 15885299.6, dated Jul. 24, 2018, 8 pages.

* cited by examiner

WIRELESS ROUTING

RELATED APPLICATION

This application was originally filed as PCT Application No. PCT/FI2015/050176 filed Mar. 17, 2015.

FIELD OF INVENTION

The present invention pertains to the field of wireless network routing.

BACKGROUND OF INVENTION

In wireless networks, mobile devices may communicate with base stations, or access points. In cellular networks, base stations comprised in radio access networks are configured to provide wireless access to mobile or non-mobile devices, such as cellular telephones, smartphones, tablet devices and other cellular-enabled devices. Examples of cellular networks include global system for mobile communication, GSM, wideband code division multiple access, WCDMA, long term evolution, LTE, and CDMA2000. In non-cellular systems, an access point may be configured to provide access to mobile or non-mobile devices. Access points may be connected to Internet routers, or to network nodes controlling the access points. An example of a non-cellular technology is wireless local area network, WLAN.

In addition to, or alternatively to, communicating with a base station or access point, devices may be arranged to communicate with each other directly. Such direct communication is known as device-to-device, D2D, communication. In detail, D2D communication comprises that devices, such as for example mobile devices, communicate with each other wirelessly such that electromagnetic signals transmitted by a first device are received in a second device, without the electromagnetic signals being re-transmitted along the way. In other words, a D2D communication link does not traverse any node along the D2D communication path that connects the D2D-communicating devices. For D2D communication to succeed, the participating devices need to be within communication range of each other.

In Wi-Fi Direct, a mobile device may assume, at least in part, the role of an access point, enabling further mobile devices to communicate with this mobile device. Wireless networks with single D2D wireless links may be referred to as single-hop ad hoc networks. An ad hoc network may comprise, for example, a network wherein network nodes have equal status and are free to associate with other network nodes in link range. Where D2D wireless links can be chained between several participating devices, the network may be referred to as a multi-hop ad hoc network. Wi-Fi 802.11 can support an ad-hoc mode which enables multi-hop ad hoc networking among a plurality of mobile devices. In general where devices engage in D2D communication with each other, this group of devices forms an ad hoc network. For example, a group of mobile devices may engage in D2D communication with each other, thus forming an ad hoc network.

In LTE networks D2D communications are presented as proximity services, ProSe. ProSe in LTE has two main aspects, firstly, ProSe discovery wherein it is established that two or more ProSe-enabled mobile devices are nearby, and, secondly, ProSe direct communication wherein the network facilitates establishment of D2D communication between the discovered ProSe-enabled mobile devices.

SUMMARY OF THE INVENTION

The invention is defined by the features of the independent claims. Some specific embodiments are defined in the dependent claims.

According to a first aspect of the present invention, there is provided an apparatus comprising a receiver configured to receive, from a first node, an indication of privacy preference and, from a second node, an indication relating to an accuracy at which the second node can determine a location of the first node, and at least one processing core configured to determine routing information based at least in part on the indication of privacy preference and the indication relating to the accuracy.

Some embodiments of the first aspect may comprise at least one feature from the following bulleted list:

- the at least one processing core is configured to determine the routing information in a way that restricts direct communication from the first node to the second node responsive to the indication relating to the accuracy indicating an advanced location determining capability and the indication of privacy preference indicating a preference for location privacy
- the advanced location determining capability comprises a beamforming capability
- the indication relating to the accuracy comprises an indication relating to at least one of range resolution and angular resolution
- the indication of privacy preference allows exactly one of requesting location privacy and not requesting location privacy
- the receiver is further configured to receive, from the first node, an indication how the first node prefers to communicate in case the indication of privacy preference cannot be followed
- the indication how the first node prefers to communicate indicates that only messages fulfilling a criterion may be transmitted over a direct radio link between mobile nodes in case the indication of privacy preference cannot be followed
- the apparatus is comprised in a fixed network node
- the apparatus is comprised in a mobile node
- the routing information comprises a routing table configured to control routing in a wireless ad hoc network.

According to a second aspect of the present invention, there is provided an apparatus comprising at least one processing core and at least one memory including computer program code, the at least one memory and the computer program code being configured to, with the at least one processing core, cause the apparatus at least to cause transmission of an indication of privacy preference and an indication relating to an accuracy at which the apparatus can determine a location of a node, receive routing information from a network, and participate in an ad hoc network based at least in part on the routing information.

Some embodiments of the second aspect may comprise at least one feature from the following bulleted list:

- the indication relating to an accuracy comprises an indication as to whether the apparatus supports beamforming
- the indication relating to the accuracy comprises an indication relating to at least one of range resolution and angular resolution
- the at least one processing core, the at least one memory and the computer program code are further configured to cause the apparatus to cause transmission of an indication how the apparatus prefers to communicate in case the indication of privacy preference cannot be followed the indication how the apparatus prefers to communicate indicates that only messages fulfilling a criterion may be transmitted in case the indication of privacy preference cannot be followed the ad hoc network comprises a wireless ad hoc network the wireless ad hoc network comprises a wireless multi-hop ad hoc network.

According to a third aspect of the present invention, there is provided a method comprising receiving, from a first node, an indication of privacy preference and, from a second node, an indication relating to an accuracy at which the second node can determine a location of the first node, and determining routing information based at least in part on the indication of privacy preference and the indication relating to the accuracy.

Some embodiments of the third aspect may comprise at least one feature corresponding to a feature from the preceding bulleted list laid out in connection with the first aspect.

According to a fourth aspect of the present invention, there is provided a method, comprising causing transmission, from an apparatus, of an indication of privacy preference and an indication relating to an accuracy at which the apparatus can determine a location of a node, receiving routing information from a network, and participating in an ad hoc network based at least in part on the routing information.

Some embodiments of the fourth aspect may comprise at least one feature corresponding to a feature from the preceding bulleted list laid out in connection with the second aspect.

According to a fifth aspect of the present invention, there is provided an apparatus comprising means for receiving, from a first node, an indication of privacy preference and, from a second node, an indication relating to an accuracy at which the second node can determine a location of the first node, and means for determining routing information based at least in part on the indication of privacy preference and the indication relating to the accuracy.

According to a sixth aspect of the present invention, there is provided an apparatus, comprising means for causing transmission of an indication of privacy preference and an indication relating to an accuracy at which the apparatus can determine a location of a node, means for receiving routing information from a network, and means for participating in an ad hoc network based at least in part on the routing information.

According to a seventh aspect of the present invention, there is provided a non-transitory computer readable medium having stored thereon a set of computer readable instructions that, when executed by at least one processor, cause an apparatus to at least receive, from a first node, an indication of privacy preference and, from a second node, an indication relating to an accuracy at which the second node can determine a location of the first node, and determine routing information based at least in part on the indication of privacy preference and the indication relating to the accuracy.

According to an eighth aspect of the present invention, there is provided a non-transitory computer readable medium having stored thereon a set of computer readable instructions that, when executed by at least one processor, cause an apparatus to at least cause transmission of an indication of privacy preference and an indication relating to an accuracy at which the apparatus can determine a location of a node, receive routing information from a network, and participate in an ad hoc network based at least in part on the routing information.

According to an ninth aspect of the present invention, there is provided a computer program configured to cause a method in accordance with the third or fourth aspect to be performed.

INDUSTRIAL APPLICABILITY

At least some embodiments of the present invention find industrial application in routing messages in wireless networks, such as for example wireless ad hoc networks.

DETAILED DESCRIPTION OF EXAMPLE EMBODIMENTS

By designing routing in D2D communications based on privacy preferences and positioning capabilities of participating mobile devices, the location of mobile devices that express a preference for location privacy may be kept confidential, as direct links to mobile devices capable of establishing their location are avoided.

Figure 1:
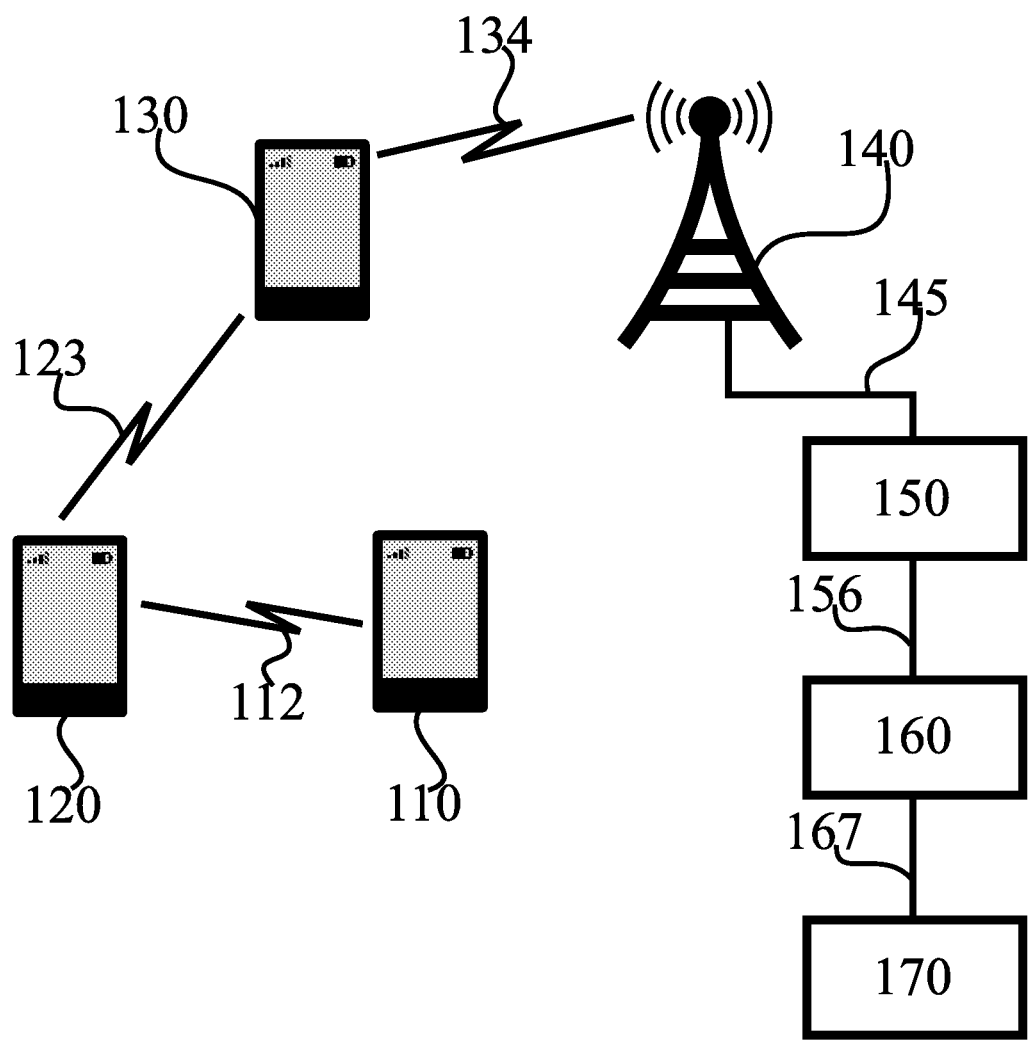
FIG. 1 illustrates an example system capable of supporting at least some embodiments of the present invention.

FIG. 1 illustrates an example system capable of supporting at least some embodiments of the present invention. The system of FIG. 1 comprises devices 110, 120 and 130. These devices may comprise, for example, cellular telephones, smartphones, tablet computers, laptop computers, desktop computers or other electronic devices capable of D2D communication. Not all of devices 110, 120 and 130 need to be of the same type, rather, they may comprise, for example, a smartphone, a tablet computer and a desktop computer. The devices may comprise mobile devices. Devices 110, 120 and 130 may be configured to act as nodes in the cellular network, and/or in an ad hoc network wherein D2D communication takes place between the devices over D2D links.

Device 110 and device 120 are arranged to communicate over D2D link 112, which may operate in accordance with a suitable wireless technology, such as LTE or Wi-Fi, for example. Device 120 and device 130 are arranged to communicate over D2D link 123, which may be arranged to operate according to the same wireless technology as D2D link 112, for example.

Device 130 is in the system of FIG. 1 in communication with base station 140 via wireless link 134. Wireless link 134 may be arranged to operate in accordance with a suitable cellular technology such as, for example, LTE. While the example system of FIG. 1 uses a cellular technology in this point, in other embodiments wireless link 134 may be non-cellular, and base station 140 may be replaced with a non-cellular access point. Wireless link 134 may comprise a downlink arranged to convey information from base station 140 to device 130. Wireless link 134 may comprise an uplink arranged to convey information from device 130 to base station 140.

Base station 140, which supports the cellular technology used in wireless link 134, may be comprised in a radio-access network of a cellular communication system. Base station 140 is in communication with core network node 150 via connection 145. Connection 145 may comprise a wireline connection, or an at least in part wireless connection. Core network node 150 may comprise, for example, a mobility management entity, MME, or a switch. The core network may comprise further core network nodes, which are not illustrated in FIG. 1 for the sake of clarity. Examples of possible further core network nodes include gateways and charging functions.

Core network node 150 is in communication with D2D function 160 via connection 156. D2D function 160 may comprise, for example, a ProSe function in embodiments where the cellular communication system in which base station 140 is comprised is an LTE system. D2D function 160 may be configured to facilitate D2D discovery and/or D2D communication management operations, where the system is configured to support network-directed D2D communication. In some embodiments, the functions of D2D function 160 may be performed by base station 140 or core network node 150, for example. In that case a separate D2D function node 160 may be unnecessary.

D2D function 160 is in communication with D2D application server 170 via connection 167. D2D application server 170 may comprise, for example, a ProSe application server in embodiments where the cellular communication system in which base station 140 is comprised is an LTE system. D2D application server 170 may be configured to run applications that use D2D communication links between devices, where the system is configured to support network-directed D2D communication. D2D application server 170 may be disposed outside of the cellular operator's domain, for example. Where D2D application server 170 is disposed outside the cellular operator's domain, connection 167 may traverse at least one network.

Where devices 110, 120 and 130 are of different types, makes or models, they may have different capabilities. Further, their users, or applications they run, may have different preferences. Devices 110, 120 and 130 may have different antenna arrangements, wherein different antenna arrangements may have different performance characteristics. Some users or applications may be indifferent to security and privacy, whereas other users or applications may have more stringent security requirements, such as, for example, mandatory use of encryption and concealment of physical location.

Beamforming is a technique in which a wireless transceiver uses multiple antennas, or antenna elements, to increase the range and/or datarate it can reach in wireless communication. The multiple antennas or antenna elements may be arranged to transmit and receive radio waves in such a way that the radio waves are reinforced in select directions, and attenuated in other directions. The effect is to create a synthetic antenna beam, which points in the direction of reinforcement and which may be electronically steerable by applying different phase shifts to the different antennas or antenna elements. The beam width may be expressed as $\delta\Theta \approx \lambda/Nd$, where $\lambda$ is a wavelength of the radio waves, N is the number of antennas or antenna elements and d is the distance between them. As radio wavelengths used in communication have tended to become shorter, use of beamforming in mobile devices is becoming attractive. Historically, beamforming has primarily been employed in the base station or access point side.

When a beamforming-enabled device participates in a D2D link with another device, the beamforming-enabled device may be able to determine the location of the other device. This is so, since the beamforming antenna can be tuned to the direction of arrival of radio waves from the other device. Combining knowledge of its own location to the direction of arrival, and measuring a round-trip time of the D2D link, the beamforming-capable device can determine the physical location of the other device. Even without measuring the round-trip time, the beamforming-capable device can determine a linear area in a known place, such that the other device is located within the linear area. A shape of the linear area corresponds to the shape of the antenna beam of the beamforming antenna. In LTE, for example, a timing advance parameter may be used by the beamforming device to estimate the position of the other device within the linear area. The timing advance is normally used in LTE to compensate for a round-trip time in communication between a mobile and a base station.

In case a user would like to cause his device to participate in an ad hoc network based on D2D communication but he prefers to keep his exact location confidential, the presence of beamforming-capable devices in the ad hoc network poses a risk, since such devices could potentially discover his location.

To participate in D2D communication while keeping his location confidential, device 110, for example, may indicate a preference for location privacy. The indication for location privacy may be comprised in a generic indication for privacy preference, for example, a single bit may indicate both that encryption of data is preferred and that location privacy is preferred for device 110. Alternatively, a single bit or indicator may indicate only whether or not location privacy is preferred. The indication may be provided, for example, to a node that is tasked with producing routing information, such as for example a routing table, for D2D communication. An absence of an indication as to preference for location privacy may be understood as an indication that location privacy is unimportant for the device, or, alternatively, that location privacy is mandatory. Where absence of indication is taken to mean location privacy is unimportant, forming ad hoc networks becomes easier. Where absence of indication is taken to mean location privacy is mandatory, communication security is on a higher level in the ad hoc network.

Device 110 may further provide an indication as to how D2D communication from device 110 should be performed in the event the expressed location privacy preference cannot be followed. For example, device 110 may indicate that D2D links should be disabled if they would expose the location of device 110, or device 110 may indicate that only certain kinds of communication flows are allowed to be routed over D2D links that may expose the location of device 110. For example, in some embodiments, communication flows that do not carry telephone calls may be routable over D2D links that may expose the location of device 110. In general, device 110 may define a criterion that defines what kind of communication flows are routable over D2D links that do not respect the preference for location privacy. In some embodiments, in case the location privacy preference cannot be followed in D2D communication, the device concerned may limit itself to a wireless link with base station 140 and forego D2D links, at least temporarily.

In the system of FIG. 1, each of devices 110, 120 and 130 may provide to D2D function 160 an indication relating to an accuracy at which the device can determine a location of another device. Such an indication may take any of a number of forms, from simply a single bit indicating whether or not the device has any capability to determine a direction from where radio waves are arriving, to an explicit indication describing angular and/or range resolution. In some embodiments, the indication indicates whether the device has a beamforming capability. In general, an advanced location determining capability may comprise that a device with advanced location determining capability has an ability to determine a direction from where radio waves carrying D2D communication arrive in the device. The device may further have the ability to determine a distance from which such radio waves are transmitted to the device.

At least one of the devices may provide to D2D function 160 an indication of preference for location privacy, as described above. In some embodiments, devices indicate to D2D function 160 their make and model, from which D2D function 160 may determine whether they have an advanced location-determining capability or no. Devices 110, 120 and 130 may further indicate their locations to D2D function 160, or, alternatively, the network in which D2D function 160 is comprised may be configured to determine estimates of the devices' locations to select devices for D2D communication.

D2D function 160 may be configured to derive the routing information to guide D2D communication between devices 110, 120 and 130. In the example of FIG. 1, device 110 expresses a preference for location privacy, while devices 120 and 130 do not. Device 130 indicates a capability to determine a direction from which radio waves arrive in device 130. For example, device 130 may indicate to D2D function 160 a beamforming capability. Devices 110 and 120 both indicate no beamforming capability. D2D function 160 may then determine the routing information and distribute it, via base station 140, to devices 110, 120 and 130. According to the routing information, device 110 shouldn't signal directly to device 130 since device 130 could determine the location of device 110, and device 110 doesn't want this to happen. On the other hand, device 110 can communicate with device 130 via device 120, as illustrated, via D2D links 112 and 123. Device 120 cannot determine the location of device 110, and device 130 can only determine the location of device 120, which signals to device 130 via D2D link 123, but not the location of device 110 since device 110 doesn't form a D2D link with device 130.

Once D2D function 160 provides the routing information to devices 110, 120 and 130, they may commence D2D communication. In some cases D2D links save energy when compared to direct links with base station 140. This may be the case, for example, where a device is far from base station 140, and there is a device which is closer and/or has a direct line-of-sight to base station 140. In the system of FIG. 1, an ad hoc network comprising devices 110, 120 and 130 is formed. In this ad hoc network there are defined D2D links 112 and 123.

Figure 2:
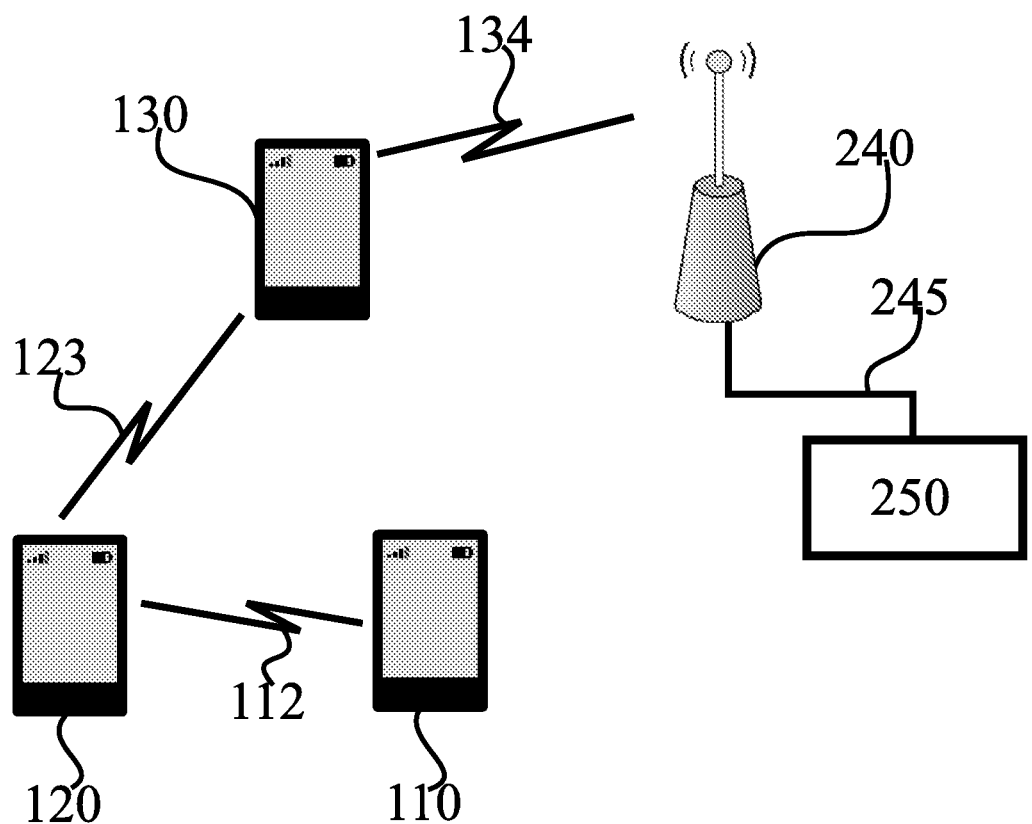
FIG. 2 illustrates an example system capable of supporting at least some embodiments of the present invention.

FIG. 2 illustrates an example system capable of supporting at least some embodiments of the present invention. In FIG. 2, like reference numbers denote like structure as in FIG. 1. In the system of FIG. 2, instead of cellular base station 140, there is a non-cellular access point 240. Further, access point 240 is connected to non-cellular gateway 250 via connection 245. The system of FIG. 2 doesn't comprise a separate D2D function, rather, routing information for D2D communication is determined in access point 240, non-cellular gateway 250 or, alternatively, in one of devices 110, 120 and 130. An advantage of determining the routing information in a network element, rather than in one of devices 110, 120 and 130, is that devices 110, 120 and 130 may be configured to trust the network and thus providing indications of location and/or capabilities to the network is in line with the operating philosophy of the devices. However, in some embodiments one of devices 110, 120 and 130 may perform the role of determining the D2D routing information, nonetheless. Also in variants of the FIG. 1 system, the D2D routing information may be derived in base station 140 or one of the devices 110, 120 and/or 130, instead of in D2D function 160. This may be the case, for example, where D2D function 160 is absent or develops a fault.

Figure 3:
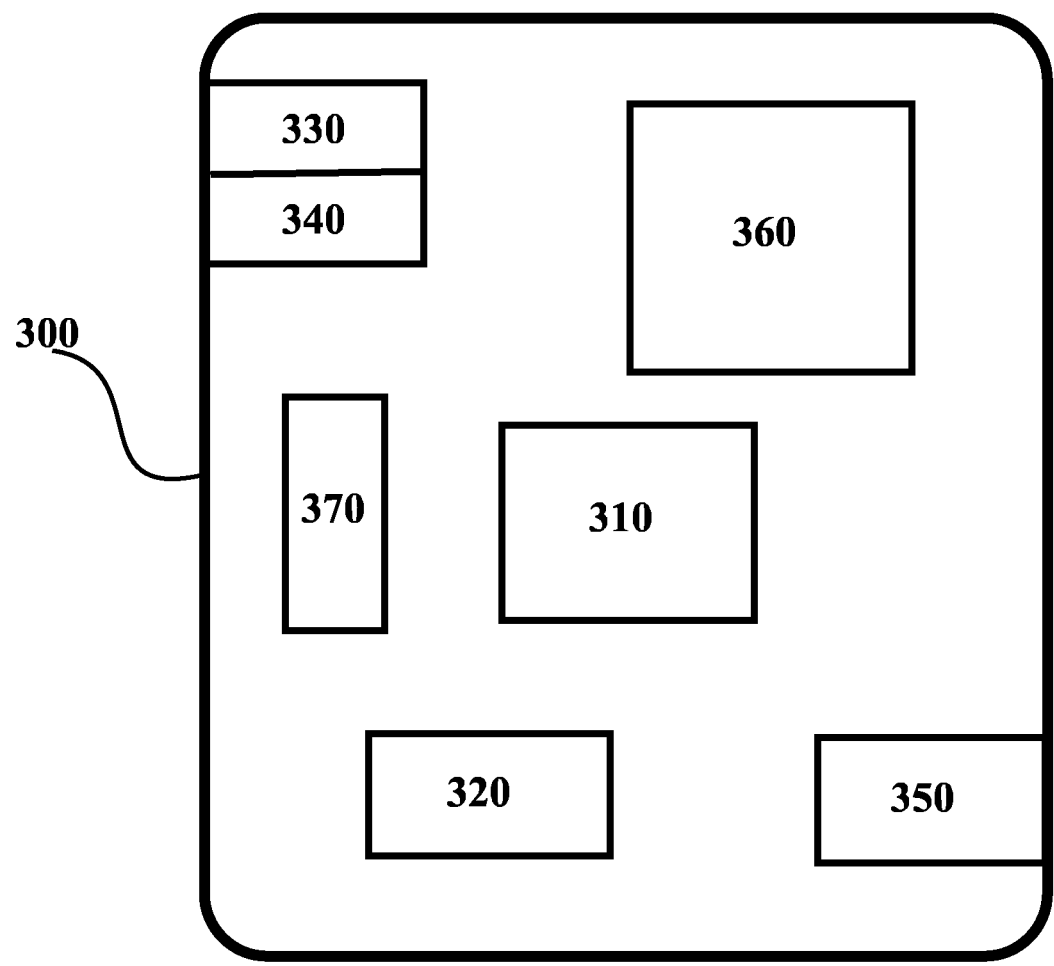
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a communication device such as device 110, 120 or 130 of FIG. 1 or FIG. 2, or a network device such as base station 140, access point 240 or, for example, D2D function 160, where applicable. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Jaguar processing core produced by Advanced Micro Devices Corporation. Processor 310 may comprise at least one Qualcomm Snapdragon, AMD Opteron, Intel Xeon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
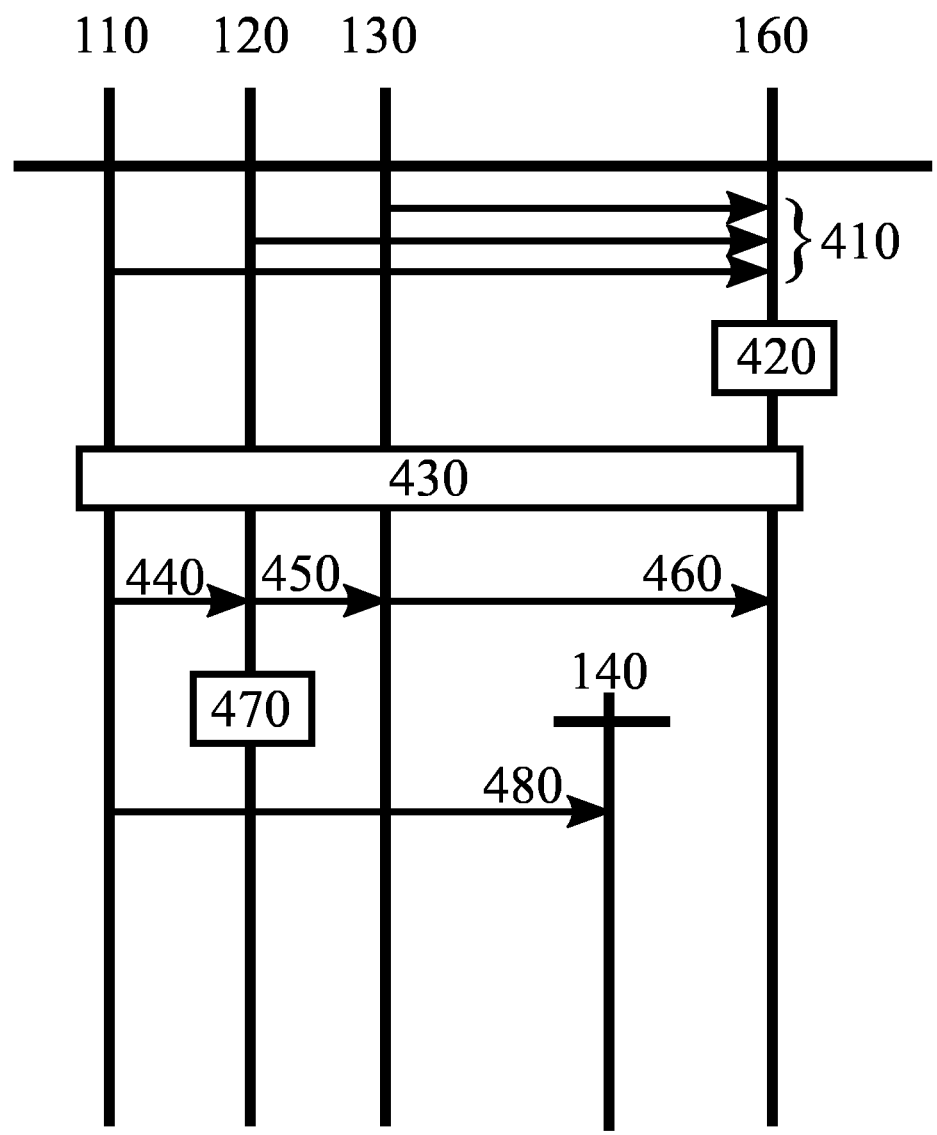
FIG. 4 illustrates signalling in accordance with at least some embodiments of the present invention.

FIG. 4 illustrates signalling in accordance with at least some embodiments of the present invention. On the vertical axes are disposed, from left to right, in terms of the system of FIG. 1, device 110, device 120, device 130 and, finally, D2D function 160. In the lower part of the figure, a further vertical axis corresponds to base station 140. Time advances from the top toward the bottom.

In phase 410, each of devices 110, 120 and 130 provides to D2D function 160 indications. The provided indications may relate to at least one, and optionally all, of the following: a location of the device, a location privacy preference of the device, a capability of the device to determine locations of other devices, and how to communicate in case the location privacy preference cannot be followed. As discussed above, the capability of the device to determine locations of other devices may comprise, for example, a beamforming capability.

In phase 420, D2D function 160 determines routing information, such as D2D routing information, such as a D2D routing table, based at least in part on the indications received in phase 410. In particular, D2D function 160 may design the routing information in a way that prevents D2D links from being formed between a device that expresses a preference for location privacy and a device that can determine locations of other devices. In the examples of FIG. 1 and FIG. 4, device 110 expresses a preference for location privacy and device 130 indicates a capability to determine locations of other devices. Therefore, in phase 420 D2D function 160 designs the routing information in a way that prevents a D2D link from being established between device 110 and device 130, since device 130 could thereby establish the location of device 110. Since device 120 does not indicate a capability to determine locations of other devices, a D2D link between device 110 and device 120 remains possible, and D2D function 160 designs the routing information accordingly.

In phase 430, D2D function 160 provides the routing information determined in phase 420 to each of devices 110, 120 and 130. Devices 110, 120 and 130 are thereby enabled to begin D2D communication and to establish an ad hoc network consisting of device 110, device 120, device 130 and D2D links arranged therein between in accordance with the routing information.

The ad hoc network is run based on D2D link 440 connecting device 110 with device 120 and D2D link 450 connecting device 120 with device 130. A further, optional, link 460 connects device 130 with D2D function 160 in the network. Link 460 may be used, for example to update the routing information in case a new device joins the ad hoc network. If device 130 receives updated routing information from D2D function 160 via link 460, it may inform device 120 of the update via link 450, and device 120 in turn may inform device 110 of the update via link 440.

In phase 470, device 120 leaves the ad hoc network, severing links 440 and 450. This may be due to, for example, device 120 being removed from the range of the ad hoc network. In the example of FIG. 4, device 110 prefers to not use D2D communication in case the location preference it has expressed cannot be followed, so device 110 switches to communicating with the network via base station 140, which is illustrated as phase 480.

Figure 5:
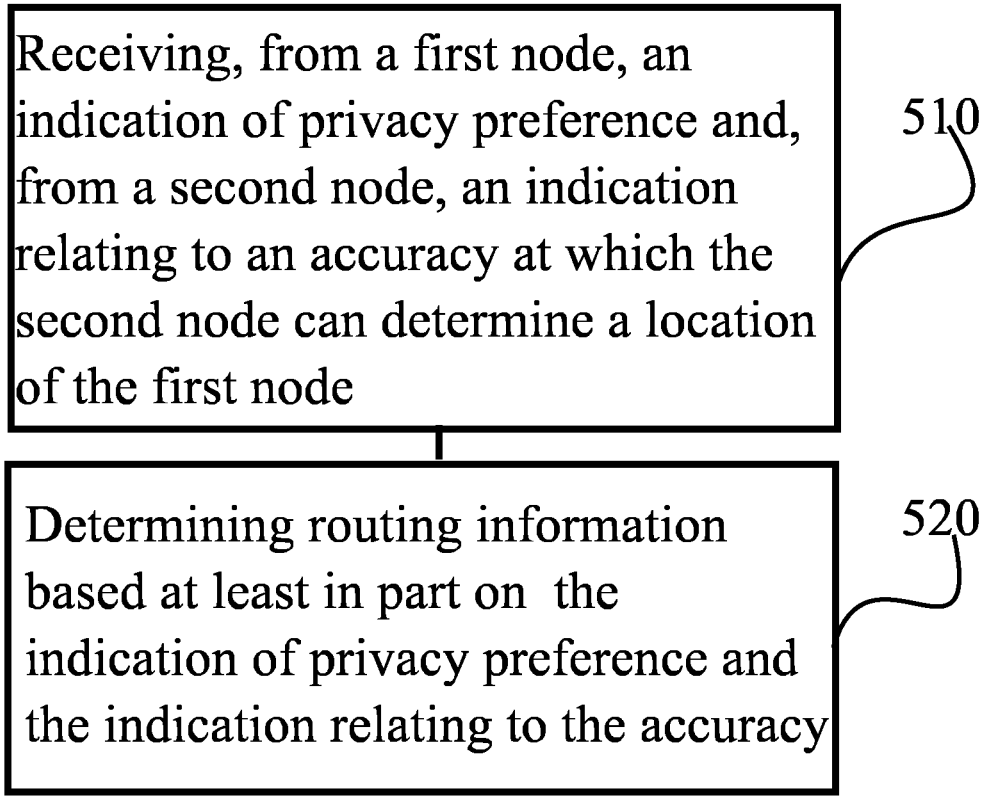
FIG. 5 is a first flow chart of a first method in accordance with at least some embodiments of the present invention.

FIG. 5 is a first flow chart of a first method in accordance with at least some embodiments of the present invention. The phases of the illustrated method may take place in D2D function 160, for example or in a control device configured to control the functioning thereof, when implanted therein. Alternatively, the phases of the illustrated method may take place in one of devices 110, 120 and 130, or in a control device configured to control the functioning thereof, when implanted therein.

Phase 510 comprises receiving, from a first node, an indication of privacy preference and, from a second node, an indication relating to an accuracy at which the second node can determine a location of the first node. Phase 520 comprises determining routing information based at least in part on the indication of privacy preference and the indication relating to the accuracy.

Figure 6:
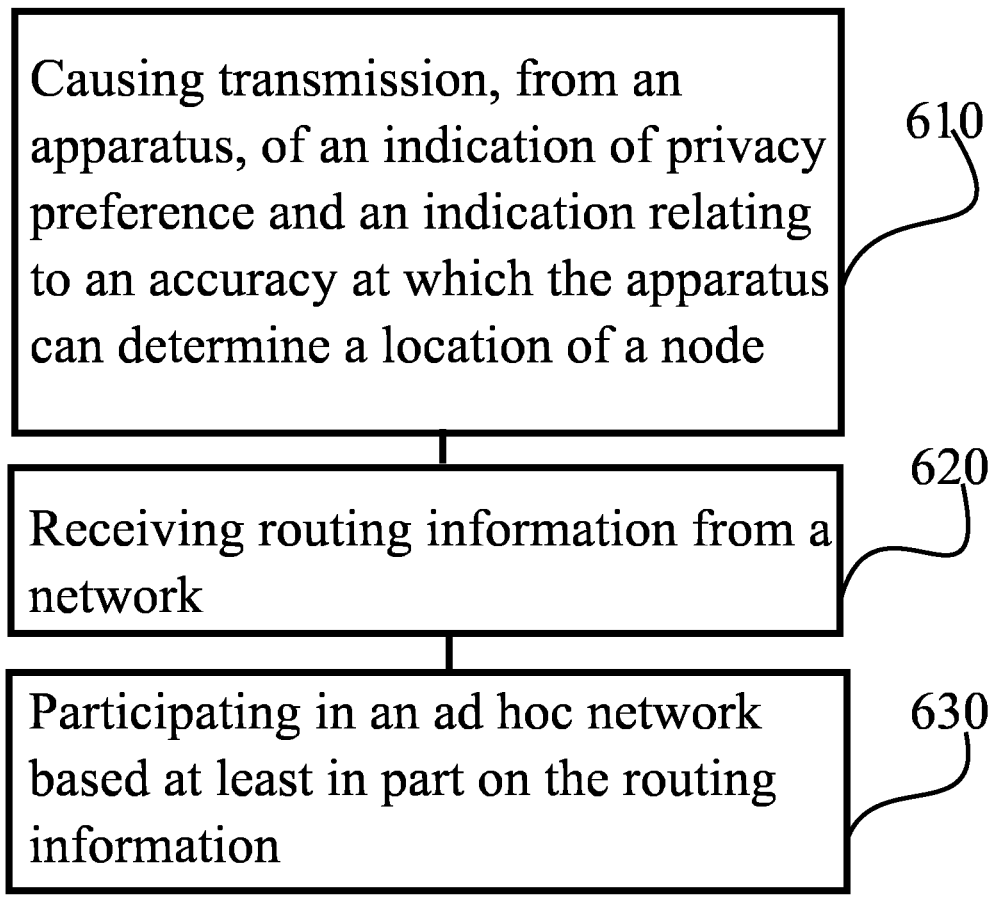
FIG. 6 is a second flow chart of a second method in accordance with at least some embodiments of the present invention.

FIG. 6 is a second flow chart of a second method in accordance with at least some embodiments of the present invention. The phases of the illustrated method may take place in one of devices 110, 120 and 130, for example, or in a control device configured to control the functioning thereof, when implanted therein.

Phase 610 comprises causing transmission, from an apparatus, of an indication of privacy preference and an indication relating to an accuracy at which the apparatus can determine a location of a node. At least one of these indications may be implicitly present in signalling. Phase 620 comprises receiving routing information from a network. Finally, phase 630 comprises participating in an ad hoc network based at least in part on the routing information.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
a receiver configured to receive, from a mobile device, an indication of location privacy preference indicating whether or not the mobile device prefers to keep its location confidential and, from a second mobile device, an indication relating to an accuracy at which the second mobile device can determine a location of the mobile device, and
at least one processing core configured to determine routing information based at least in part on the indication of location privacy preference and the indication relating to the accuracy, wherein direct links to further mobile devices capable of establishing the location of the mobile device are avoided responsive to the indication of privacy preference expressing a preference for location privacy.

2. The apparatus according to claim 1, wherein the at least one processing core is configured to determine the routing information in a way that avoids the direct links from the first mobile device to the second mobile device responsive to the indication relating to the accuracy indicating an advanced location determining capability and the indication of location privacy preference indicating the preference for keeping the location of the mobile device confidential.

3. The apparatus according to claim 2, wherein the advanced location determining capability comprises a beamforming capability.

4. The apparatus according to claim 1, wherein the indication relating to the accuracy comprises an indication relating to at least one of range resolution and angular resolution.

5. The apparatus according to claim 1, wherein the indication of location privacy preference allows exactly one of requesting location privacy and not requesting location privacy.

6. The apparatus according to claim 1, wherein the receiver is further configured to receive, from the first mobile device, an indication how the first mobile device prefers to communicate in case the indication of location privacy preference cannot be followed.

7. The apparatus according to claim 6, wherein the indication how the first mobile device prefers to communicate indicates that only messages fulfilling a criterion may be transmitted over a direct radio link between mobile nodes in case the indication of location privacy preference cannot be followed.

8. The apparatus according to claim 1, wherein the apparatus is comprised in a fixed network node.

9. The apparatus according to claim 1, wherein the apparatus is comprised in a mobile node.

10. The apparatus according to claim 1, wherein the routing information comprises a routing table configured to control routing in a wireless ad hoc network.

11. A method comprising:
receiving, from a mobile device, an indication of location privacy preference indicating whether or not the mobile device prefers to keep its location confidential and, from a second mobile device, an indication relating to an accuracy at which the second mobile device can determine a location of the mobile device, and
determining routing information based at least in part on the indication of location privacy preference and the indication relating to the accuracy, wherein direct links to further mobile devices capable of establishing the location of the mobile device are avoided responsive to the indication of privacy preference expressing a preference for location privacy.

12. The method according to claim 11 wherein the routing information is determined in a way that avoids the direct links from the mobile device to the second mobile device responsive to the indication relating to the accuracy indicating an advanced location determining capability and the indication of location privacy preference indicating the preference for keeping the location of the mobile device confidential.

13. The method according to claim 12, wherein the advanced location determining capability comprises a beamforming capability.

14. The method according to claim 11, wherein the indication relating to the accuracy comprises an indication relating to at least one of range resolution and angular resolution.

15. The method according to claim 11, wherein the indication of location privacy preference allows exactly one of requesting location privacy and not requesting location privacy.

16. The method according to claim 11, further comprising receiving, from the mobile device, an indication how the mobile device prefers to communicate in case the indication of privacy preference cannot be followed.

17. The method according to claim 16, wherein the indication how the mobile device prefers to communicate indicates that only messages fulfilling a criterion may be transmitted in case the indication of privacy preference cannot be followed.

18. A non-transitory computer readable medium having stored thereon a set of computer readable instructions that, when executed by at least one processor, cause an apparatus to at least:
receive, from a mobile device, an indication of location privacy preference indicating whether or not the mobile device prefers to keep its location confidential and, from a second mobile device, an indication relating to an accuracy at which the second mobile device can determine a location of the mobile device, and
determine routing information based at least in part on the indication of location privacy preference and the indication relating to the accuracy, wherein direct links to further mobile devices capable of establishing the location of the mobile device are avoided responsive to the indication of privacy preference expressing a preference for location privacy.

\* \* \* \* \*